United States Patent [19]

Madan et al.

[11] Patent Number: 5,567,763
[45] Date of Patent: Oct. 22, 1996

[54] POLYURETHANE SPRAY SYSTEMS HAVING IMPROVED FLAME-RETARDANT PROPERTIES

[75] Inventors: Sanjeev Madan, Coraopolis, Pa.; Peter K. Hyde-Smith, Mayville, Mich.

[73] Assignees: Bayer Corporation, Pittsburgh, Pa.; Foamseal, Inc., Oxford, Mich.

[21] Appl. No.: 290,624

[22] Filed: Aug. 15, 1994

[51] Int. Cl.$^6$ ..................... C08K 3/38
[52] U.S. Cl. ............ 524/701; 524/411; 524/412; 524/437; 524/405; 524/432; 524/783; 524/786; 524/780
[58] Field of Search ............... 524/783, 786, 524/780, 701, 411, 412, 437, 405, 432

[56] References Cited

U.S. PATENT DOCUMENTS

| | | | |
|---|---|---|---|
| 3,899,463 | 8/1975 | Newcombe | 524/412 |
| 4,147,678 | 4/1979 | Mao et al. | 521/115 |
| 4,397,974 | 8/1983 | Goyert et al. | 524/143 |
| 4,748,195 | 5/1988 | Hackl | 523/445 |
| 5,192,594 | 3/1993 | Madan et al. | 427/421 |
| 5,233,009 | 8/1993 | Madan et al. | 528/60 |
| 5,275,888 | 1/1994 | Madan et al. | 428/423.3 |
| 5,302,303 | 4/1994 | Clatty et al. | 252/6.5 |
| 5,376,208 | 12/1994 | Yao et al. | 524/371 |
| 5,401,824 | 3/1995 | Clatty et al. | 528/53 |

*Primary Examiner*—Rachel Johnson
*Attorney, Agent, or Firm*—Joseph C. Gil; Richard E. L. Henderson

[57] ABSTRACT

This invention relates to a flame-retardant polyurethane spray system prepared by mixing at an isocyanate index of from 90 to 120

(A) an isocyanate composition containing
  (a) an organic polyisocyanate, and
  (b) 0 to 50 wt. %, relative to the organic polyisocyanate, of a halogen-containing organic flame retardant; and
(B) an isocyanate-reactive composition containing
  (a) 10 to 80 wt. % of an isocyanate-reactive compound having a molecular weight of 400 to 10,000 and functionality of 2 to 7;
  (b) 1 to 50 wt. % of an isocyanate-reactive compound having a molecular weight less than 399 and functionality of 2 to 6;
  (c) 0 to 15 wt. % of an isocyanate-reactive tertiary amine polyether having a molecular weight of 100 to 1000;
  (d) 5 to 55 wt. % of a flame retardant other than a halogen-containing organic flame retardant, optionally in combination with a halogen-containing organic flame retardant, with the proviso that the weight ratio of the total amount of halogen-containing organic flame retardant in (A) and (B) to the amount of other flame retardants in (B) is from 0.4 to 1.5;
  (e) 0.01 to 1.5 wt. % of an organic metal catalyst or a mixture thereof with a tertiary amine catalyst; and
  (f) 0 to 15 wt. % of additives,
  wherein the quantities of components (B)(a) to (B)(f) are relative to the total amount of components (B)(a) to (B)(e).

The invention further relates to a method for spray application of such flame-retardant polyurethane systems and to the resultant polyurethanes.

17 Claims, No Drawings

POLYURETHANE SPRAY SYSTEMS HAVING IMPROVED FLAME-RETARDANT PROPERTIES

BACKGROUND OF THE INVENTION

This invention relates to polyurethane spray systems having improved flame-retardant properties, particularly those based on storage-stable isocyanate-reactive compositions containing flame retardants. Spray systems based on polyurethanes are known. For example, U.S. Pat. Nos. 5,192,594, 5,233,009, and 5,275,888. However, polyurethane spray systems having improved flame and smoke performance would be desirable. One object of the present invention was to develop polyurethane spray systems having such improved performance.

Another object of the invention was improvement in shelf-life stability of the isocyanate-reactive compositions used to prepare polyurethane spray systems without sacrificing flame properties of the polyurethane product. Shelf-life stability, as measured by change in reactivity with the isocyanate component, is often adversely affected by the addition of flame retardants, especially those based on phosphorus, zinc, antimony, and aluminum. E.g., U.S. Pat. No. 5,302,303. It has now been found that the use of certain tertiary amines provides isocyanate-reactive compositions having improved storage stability without adversely affecting the improved flame properties of the polyurethane spray systems of the invention.

SUMMARY OF THE INVENTION

This invention relates to a flame-retardant polyurethane spray system comprising a mixture, prepared at an isocyanate index of from about 90 to about 120 (preferably 95 to 110), comprising (A) an isocyanate composition comprising
  (a) an organic polyisocyanate, and
  (b) 0 to about 50 percent by weight (preferably 20 to 35 percent by weight), relative to the organic polyisocyanate, of a halogen-containing organic flame retardant (preferably a halogen-containing aromatic flame retardant); and (B) an isocyanate-reactive composition comprising
  (a) about 10 to about 80 percent by weight (preferably 20 to 60 percent by weight) of at least one isocyanate-reactive compound having a molecular weight of 400 to about 10,000 and a functionality of about 2 to about 7 (preferably 2 to 4);
  (b) about 1 to about 50 percent by weight (preferably 3 to 35 percent by weight) of at least one isocyanate-reactive compound having a molecular weight of less than 399 and a functionality of about 2 to about 6 (preferably 2 to 4);
  (c) 0 to about 15 percent by weight (preferably 3 to 15 percent by weight, more preferably 4 to 10 percent by weight) of an isocyanate-reactive tertiary amine polyether having a molecular weight of about 100 to about 1000 and having the formula $R[NR^1R^2]_m$ 

wherein
  R is a saturated or unsaturated $C_2$–$C_8$ aliphatic group optionally substituted with —OH or —$NHR^a$ wherein $R^a$ is $C_1$–$C_8$ alkyl or $C_2$–$C_8$ alkenyl; or a saturated or unsaturated $C_5$–$C_8$ cycloaliphatic group optionally substituted with $C_1$–$C_8$ alkyl, $C_2$–$C_8$ alkenyl, $C_1$–$C_8$ alkylene, —OH or —$NHR^a$ wherein $R^a$ is alkyl or alkenyl;
  $R^1$ and $R^2$ are independently polyether groups terminated with isocyanate-reactive groups selected from —OH and —$NHR^b$  wherein $R^b$ is $C_1$–$C_8$ alkyl or $C_2$–$C_8$ alkenyl (preferably hydroxy-terminated polyether groups containing polypropylene oxide units); and m is an integer of from 1 to 4 (preferably 2);
  (d) about 5 to about 55 percent by weight (preferably 20 to 48 percent by weight) of one or more flame retardants other than a halogen-containing organic flame retardant (preferably zinc borates, alumina trihydrate, antimony oxides, and mixtures thereof), optionally in combination with a halogen-containing organic flame retardant, with the proviso that the weight ratio of the total amount of halogen-containing organic flame retardant in compositions (A) and (B) to the amount of other flame retardants in composition (B) is from about 0.4 to about 1.5 (preferably from 0.4 to 1.2, more preferably 0.8 to 1.1);
  (e) about 0.01 to about 1.5 percent by weight (preferably 0.1 to 1.0 percent by weight) of an organic metal catalyst (preferably tin and/or bismuth compounds) or a mixture thereof with a tertiary amine catalyst; and
  (f) 0 to about 15 percent by weight of additives (preferably one or more acid scavengers, defoaming agents, and/or water scavengers), wherein the quantities of each component of isocyanate-reactive composition (B) are based on the total amount of components (B)(a), (B)(b), (B)(c), (B)(d), and (B)(e).

This invention further relates to a method for the spray application of such flame-retardant polyurethane systems and to the resultant polyurethanes.

DETAILED DESCRIPTION OF THE INVENTION

Suitable organic polyisocyanates for use in isocyanate composition (A) can be unmodified isocyanates, modified polyisocyanates, or isocyanate prepolymers. Suitable polyisocyanates include aliphatic, cycloaliphatic, araliphatic, aromatic, and heterocyclic polyisocyanates of the type described, for example, by W. Siefken in *Justus Liebigs Annalen der Chemie*, 562, pages 75 to 136. Such isocyanates include those having the formula $Q(NCO)_n$ in which n is a number from 2 to about 5 (preferably 2 to 3) and Q is an aliphatic hydrocarbon group containing 2 to about 18 (preferably 6 to 10) carbon atoms, a cycloaliphatic hydrocarbon group containing 4 to about 15 (preferably 5 to 10) carbon atoms, an araliphatic hydrocarbon group containing 8 to 15 (preferably 8 to 13) carbon atoms, or an aromatic hydrocarbon group containing 6 to about 15 (preferably 6 to 13) carbon atoms. Examples of suitable isocyanates include ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and -1,4-diisocyanate, and mixtures of these isomers; 1-isocyanato-3,3,5-trimethyl-5-isocyanatomethylcyclohexane ("isophorone diisocyanate"; see, e.g. German Auslegeschrift 1,202,785 and U.S. Pat. No. 3,401,190); 2,4 - and 2,6-hexahydrotoluene diisocyanate and mixtures of these isomers; dicyclohexylmethane-4,4'- diisocyanate ("hydrogenated MDI", or "HMDI"); 1,3- and 1,4-phenylene diisocyanate; 2,4- and 2,6-toluene diisocyanate and mixtures of these isomers ("TDI"); diphenylmethane-2,4'- and/or -4,4'-diisocyanate ("MDI"); naphthylene-1,5-diisocyanate; triphenylmethane-4,4,4"-triisocyanate; polyphenyl-polymethylene-polyisocyanates of the type which may be obtained by condensing aniline with formaldehyde, followed by phosgenation ("crude MDI"), which are described, for example, in British Patents 878,430 and 848,671; norbornane diisocyanates, such as described in U.S. Pat. No. 3,492,330; m- and p-isocyanatophenyl sulfonylisocyanates of the type described in U.S. Pat. No. 3,454,606; perchlorinated aryl polyisocyanates of the type described, for example, in U.S. Pat. No. 3,227,138; modified polyisocyanates containing carbodiimide groups of the type described in U.S. Pat. No. 3,152,162; modified polyisocyanates containing urethane groups of the type described, for example, in U.S. Pat. Nos. 3,394,164 end 3,644,457; modified polyisocyanates containing allophanate groups of the type described, for example, in British Patent 994,890, Belgian Patent 761,616, and published Dutch Patent Application 7,102,524; modified polyisocyanates containing isocyanurate groups of the type described, for example, in U.S. Pat. No. 3,002,973, German Patentschrifien 1,022,789, 1,222,067 and 1,027,394, and German Offenlegungsschrifien 1,919,034 and 2,004,048; modified polyisocyanates containing urea groups of the type described in German Patentschrift 1,230,778; polyisocyanates containing biuret groups of the type described, for example, in German Patentschrift 1,101,394, U.S. Pat. Nos. 3,124,605 and 3,201,372, and in British Patent 889,050; polyisocyanates obtained by telomerization reactions of the type described, for example, in U.S. Pat. No. 3,654,106; polyisocyanates containing ester groups of the type described, for example, in British Patents 965,474 and 1,072,956, in U.S. Pat. No. 3,567,763, and in German Patentschrift 1,231,688; reaction products of the abovementioned isocyanates with acetals as described in German Patentschrifi 1,072,385; and polyisocyanates containing polymeric fatty acid groups of the type described in U.S. Pat. No. 3,455,883. It is also possible to use the isocyanate-containing distillation residues accumulating in the production of isocyanates on a commercial scale, optionally in solution in one or more of the polyisocyanates mentioned above. It is also possible to use mixtures of the polyisocyanates described above.

In general, it is preferred to use readily available polyisocyanates, such as MDI or crude MDI, as well as polyisocyanates containing carbodiimide groups, urethane groups, allophanate groups, isocyanurate groups, urea groups, or biuret groups ("modified polyisocyanates").

It is, of course, also possible to use isocyanate prepolymers prepared by reaction of any of the above polyisocyanates with a substoichiometric amount of an isocyanate-reactive compound such as, for example, those described below for component (B)(a).

Halogen-containing organic flame retardants can optionally be added to isocyanate composition (A) in amounts of up to about 50 percent by weight relative to the organic polyisocyanate component (A)(a). When such halogen-containing organic flame retardants are used, the viscosity of the isocyanate compositions typically increases, thereby often improving processing and mixing during spraying. If halogen-containing organic flame retardants are blended with the organic polyisocyanate component, it is necessary to use a quantity such that the weight ratio of the total amount of halogen-containing organic flame retardant in compositions (A) and (B) to the amount of the other flame retardants in composition (B) will range from about 0.4 to about 1.5 (preferably from 0.4 to 1.2 and more preferably 0.8 to 1.1). Suitable halogen-containing organic flame retardants (A)(b) (which, as the term is used herein, also include smoke suppressants and other known combustion modifiers) include halogen-containing organic compounds known in the art for use as flame retardants. Preferred halogen-containing organic flame retardant are halogen-containing aromatic flame retardants, such as brominated diphenyl ethers (e.g., pentabromodiphenyl oxide and decabromodiphenyl oxide ), polytribromostyrene, trichloromethyltetrabromobenzene, tetrabromobisphenol A, and an aromatic brominated flame retardant available as SAYTEX 8010 from Ethyl Corporation. Examples of the less preferred non-aromatic halogen-containing flame retardants include dibromopentaerythritol, hexabromocyclododecane, trichloropropyl phosphate. Mixtures of halogen-containing organic flame retardants are, of course, also suitable. It is possible, although much less preferred, to use small amounts of other known flame retardants that do not contain isocyanate-reactive groups and are essentially free of water.

Suitable isocyanate-reactive compounds for use as component (B)(a) according to the present invention having a molecular weight of 400 to about 10,000 include compounds containing hydroxyl groups, amino groups, thiol groups, or a combination thereof. Suitable such compounds include polyethers, polyesters, polyacetals, polyesterethers, polyester carbonates, polythioethers, polyamides, polyesteramides, polysiloxanes, polybutadienes, and polyacetones, and are described, for example, in German Offenlegungsschrift 2,832,253 at pages 11 to 20. Particularly preferred isocyanate-reactive compounds are polyethers, polyesters, and polyacetals containing 2 to 4 reactive hydroxyl or, less preferably, amino groups.

Hydroxyl-containing polyethers are suitable for use as isocyanate-reactive component (B)(a). Suitable hydroxyl-containing polyethers can be prepared, for example, by polymerization of epoxides such as ethylene oxide, propylene oxide, butylene oxide, tetrahydrofuran, styrene oxide, or epichlorohydrin, optionally in the presence of $BF_3$, or by chemical addition of such epoxides, optionally as mixtures or successively, to starting components containing reactive hydrogen atoms, such as water, alcohols, or amines. Examples of such starting components include ethylene glycol, 1,2- or 1,3-propanediol, 1,2-, 1,3-, or 1,4-butanediol, glycerin, trimethylolpropane, pentaerythritol, 4,4'-dihydroxydiphenylpropane, aniline, 2,4- or 2,6-diaminotoluene, ammonia, ethanolamine, triethanolamine, or ethylene diamine. Polyethers that contain predominantly primary hydroxyl groups (up to about 90% by weight, based on all of the hydroxyl groups in the polyether) are also suitable. Polyethers modified by vinyl polymers of the kind obtained, for example, by the polymerization of styrene and acrylonitrile in the presence of polyethers (e.g., U.S. Pat. Nos. 3,383,351, 3,304,273, 3,523,093, and 3,110,695 and German Patentschrift 1,152,536) are also suitable, as are polybutadienes containing hydroxyl groups. Sucrose-initiated polyethers of the type described, for example, in German Auslegeschrifien 1,176,358 and 1,064,938 are particularly suitable. Particularly preferred polyethers include polyoxyalkylene polyether polyols, such as polyoxyethylene diol, polyoxypropylene diol, polyoxybutylene diol, and polytetramethylene diol.

Hydroxyl-containing polyesters are also suitable for use as isocyanate-reactive component (B)(a). Suitable hydroxyl-containing polyesters include reaction products of polyhydric alcohols (preferably diols), optionally with the addition of trihydric alcohols, and polybasic (preferably dibasic) carboxylic acids. Instead of free polycarboxylic acids, the corresponding polycarboxylic acid anhydrides or corresponding polycarboxylic acid esters of lower alcohols or mixtures thereof may be used for preparing the polyesters. The polycarboxylic acids may be aliphatic, cycloaliphatic, aromatic, or heterocyclic and may be substituted, e.g., by halogen atoms, and/or unsaturated. Suitable polycarboxylic acids include succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endo-methylene tetrahydrophthalic acid anhydride, glutaric acid anhydride, maleic acid, maleic acid anhydride, fumaric acid, dimeric and trimeric fatty acids, dimethyl terephthalic, and terephthalic acid bis-glycol esters. Suitable polyhydric alcohols include ethylene glycol, 1,2- and 1,3-propanediol, 1,4- and 2,3-butanediol, 1,6-hexanediol, 1,8-octanediol, neopentyl glycol, 1,3- and 1,4-bis(hydroxymethyl)cyclohexane, 2-methyl-1,3-propanediol, glycerol, trimethylolpropane, 1,2,6-hexanetriol, 1,2,4-butanetriol, trimethylolethane, pentaerythritol, quinitol, mannitol, sorbitol, methyl glycoside, diethylene glycol, triethylene glycol, tetraethylene glycol, polyethylene glycols, dipropylene glycol, polypropylene glycols, dibutylene glycol, and polybutylene glycols. The polyesters may also contain a proportion of carboxyl end groups. Polyesters of lactones, such as $\epsilon$-caprolactone, or of hydroxycarboxylic acids, such as $\epsilon$-hydroxycaproic acid, may also be used. Hydrolyrically stable polyesters are preferably used in order to obtain the greatest benefit relative to the hydrolyric stability of the final product. Preferred polyesters include polyesters obtained from adipic acid or isophthalic acid and straight chained or branched diols, as well as lactone polyesters, preferably those based on caprolactone and diols.

Suitable polyacetals for use as isocyanate-reactive component (B)(a) include compounds obtained from condensation of glycols, such as diethylene glycol, triethylene glycol, 4,4'-dihydroxydiphenylmethane, and hexanediol, with formaldehyde or by the polymerization of cyclic acetals, such as trioxane.

Although generally less preferred, isocyanate-reactive compounds containing amino groups can also be used as isocyanate-reactive component (B)(a). Such compounds include the so-called amine-terminated polyethers containing primary or secondary (preferably primary) aromatically or aliphatically (preferably aliphatically) bound amino groups. Compounds containing amino end groups can also be attached to the polyether chain through urethane or ester groups. These amine-terminated polyethers can be prepared by any of several methods known in the art.

Suitable isocyanate-reactive compounds (B)(b) have a molecular weight of less than 399 and a functionality of about 2 to about 6 (preferably 2 to 4) and are often referred to as chain extenders (functionality of about 2) or crosslinkers (functionality greater than 2). Such compounds contain hydroxyl groups, amino groups, thiol groups, or a combination thereof, and generally contain 2 to 8 (preferably 2 to 4) isocyanate-reactive hydrogen atoms. Chain extenders containing amino groups are particularly preferred.

The preferred amine chain extenders contain exclusively aromatically bound primary or secondary (preferably primary) amino groups and preferably also contain alkyl substituents. Examples of such aromatic diamines include 1,4-diaminobenzene, 2,4- and/or 2,6-diaminotoluene, meta-xylene diamine, 2,4'- and/or 4,4'-diaminodiphenylmethane, 3,3'-dimethyl-4,4'-diaminodiphenylmethane, 1-methyl-3,5-bis(methylthio)-2,4- and/or-2,6-diaminobenzene, 1,3,5-triethyl-2,4-diaminobenzene, 1,3,5-triisopropyl-2,4-diaminobenzene, 1-methyl-3,5-diethyl-2,4- and/or -2,6-diaminobenzene, 4,6-dimethyl-2-ethyl-1,3-diaminobenzene, 3,5,3,5'-tetraethyl-4,4-diaminodiphenylmethane, 3,5,3,5'-tetraisopropyl-4,4'-diaminodiphenylmethane, and 3,5-diethyl-3,5'-diisopropyl-4,4'-diaminodiphenylmethane. Although generally less preferred, certain (cyclo)aliphatic diamines are also suitable. A particularly suitable (cyclo)aliphatic diamine is 1,3-bis(aminomethyl)cyclohexane. Such diamines may, of course, also be used as mixtures.

The less preferred hydroxyl-containing chain extenders and cross-linkers include glycols and polyols, such as 1,2-ethanediol, 1,2- and 1,3-propylene glycol, 1,4- and 2,3-butylene glycol, 1,6-hexanediol, 1,8-octanediol, neopentyl glycol, cydohexanedimethanol, 1-methyl-1,3-propanediol, 2-methyl-1,3-propanediol, glycerol, trimethylolpropane, 1,2,6-hexanetriol, pentaerythritol, 1,2,4-butanetriol, and trimethylolethane. Also suitable are hydroxyl-containing polyethers having a molecular weight of less than 399, such as polyoxyalkylene polyether polyols, such as polyoxyethylene diol, polyoxypropylene diol, polyoxybutylene diol, and polytetramethylene diol having the requisite molecular weights. Such hydroxyl-containing polyethers can be prepared, for example, by the methods discussed above for the hydroxy-containing polyethers of component (B)(a) except that only lower molecular weight polyethers are used for component (B)(b).

The use of up to about 15 percent by weight (preferably 3 to 15 percent by weight and more preferably 4 to 10 percent by weight) of isocyanate-reactive tertiary amine polyethers (B)(c) provides the additional advantage of providing isocyanate-reactive compositions (B) having improved storage stability. See U.S. Pat. No. 5,302,303. Suitable isocyanate-reactive tertiary amine polyethers (B)(c) include compounds having the formula

$$R[NR^1R^2]_m$$

wherein R, $R^1$, $R^2$, and m have the meanings given above.

The term "saturated or unsaturated $C_2$–$C_8$ aliphatic" as applied to group R of component (B)(c) refers to straight or branched chain hydrocarbon groups having from 2 to 8 carbon atoms attached to from 1 to 4 —$NR^1R^2$ groups (preferably with no carbon atom being attached to two nitrogen atoms) and optionally containing carbon-carbon double bonds (with the proviso that no double-bonded carbon atom is attached directly to a nitrogen atom). For example, when m is 2, saturated or unsaturated $C_2$–$C_8$ aliphatic groups include linear ethylene, propylene, butylene, pentylene, hexylene, heptylene, and octylene groups, as well as the isomeric branched forms thereof. The term "saturated or unsaturated $C_5$–$C_8$ cycloaliphatic" as applied to group R of component (B)(c) refers to cyclopentane, cyclohexane, cycloheptane, and cyclooctane groups, as well as to $C_1$–$C_8$ alkyl derivatives thereof, that are attached to the —$NR^1R^2$ groups either directly to the ring carbon atoms or indirectly through the optional $C_1$–$C_8$ alkylene substituents (preferably with no carbon atom being attached directly to two nitrogen atoms) and that optionally contain carbon-carbon double bonds in the cyclic moiety (preferably with no double-bonded carbon atom being attached directly to a nitrogen atom). For example, when m is 2, preferred saturated or unsaturated $C_5$–$C_8$ cycloaliphatic groups include the various isomeric cyclopentylene, cyclohexylene, cycloheptylene, and cyclooctylene groups.

Each group R can optionally be substituted with —OH or —NHR$^a$ groups wherein R$^a$ is $C_1$–$C_8$ alkyl or $C_2$–$C_8$ alkenyl (preferably alkenyl in which no double-bonded carbon atom is attached directly to a nitrogen atom), particularly when m is 1, to provide additional isocyanate-reactive sites. Examples of suitable such groups R when m is 1 include hydroxyethyl and hydroxypropyl.

The term "polyether groups terminated with isocyanate-reactive groups" as applied to groups $R^1$ and $R^2$ of component (B)(c) refers to polyethers prepared, for example, by the general methods described above for preparing isocyanate-reactive component (B)(a), provided that one end of each polyether chain is attached to the nitrogen atom indicated in the formula and the other end is terminated by at least one —OH or —NHR$^b$ group and further provided that the molecular weight of the resultant tertiary amine polyether (B)(c) ranges from about 100 to about 1000. Suitable polyethers include hydroxy-terminated polyoxyalkylene polyethers, such as those having polyoxyethylene, polyoxypropylene, polyoxybutylene, or polytetramethylene groups, especially hydroxy-terminated polyoxyethylene groups.

Particularly preferred isocyanate-reactive tertiary amine polyethers (B)(c) are those in which R is a difunctional saturated $C_2$–$C_8$ aliphatic group, $R^1$ and $R^2$ are independently hydroxy-terminated polyethers containing exclusively polypropylene oxide units, and m is 2, and in which the molecular weight is from 200 to 600.

Suitable flame retardants (B)(d) (which, as the term is used herein, include smoke suppressants and other known combustion modifiers), include antimony oxides (such as antimony pentoxide and antimony trioxide); zinc compounds (such as various known zinc borates); aluminum compounds (such as alumina trihydrate); magnesium compounds (such as magnesium hydroxide); molybdenum compounds (such as molybdic oxide and ammonium octamolybdate); other known inorganic compounds, such as the proprietary smoke additive available as CHARMAX from Polymer Additives Group (Division of R. J. Marshall); and melamine. Mixtures of such compounds are, of course, also suitable. Preferred flame retardants include aluminum-, antimony-, and zinc-based compounds. Antimony pentoxide is a particularly preferred flame retardant and that zinc borate is a particularly effective smoke suppressant. Although phosphonates, phosphites, and phosphates (such as dimethyl methylphosphonate, ammonium polyphosphate, and various cyclic phosphate and phosphonate esters known in the art) and intumescent additives (such as alkylamine phosphates and other nitrogen-phosphorus-containing intumescent compounds) are generally not suitable for spray applications according to this invention and are thus generally not suitable for use as the only flame retardants (B)(d), it is possible to use small quantities of such phosphorus-containing compounds and intumescent additives in admixture with other known flame retardants.

Depending on the amount of halogen-containing organic flame retardant used in isocyanate composition (A), it is also possible to include such halogen-containing organic flame retardants as part of component (B)(d) if the weight ratio of the total amount of the halogen-containing organic flame retardant in compositions (A) and (B) to the amount of other flame retardants in composition (B) is kept between about 0.4 and about 1.5. When a halogen-containing organic flame retardant is used, the total amount of flame retardants used in composition (B) should still remain in the range of about 5 to about 55 percent by weight based on the total amount of components (B)(a) to (B)(e).

Suitable catalysts (B)(e) include metal compounds known in the art, optionally in admixture with smaller amounts (i.e., less than about 50% by weight) of various tertiary amines. Suitable catalysts include organic metal compounds, especially organic tin, bismuth, and zinc compounds. Suitable organic tin compounds include tin(11) salts of carboxylic acids, such as tin(11) acetate, tin(11) octoate, tin(11) ethylhexoate, and tin(11) laurate, as well as tin(IV) compounds, such as dibutyltin dilaurate, dibutyltin dichloride, dibutyltin diacetate, dibutyltin maleate, and dioctyltin diacetate, and, less preferably, tin compounds containing sulfur, such as dioctyl tin mercaptide (German Auslegeschrift 1,769,367 and U.S. Pat. No. 3,645,927). Suitable bismuth compounds include bismuth neodecanoate, bismuth versalate, and various bismuth carboxylates known in the art. Suitable zinc compounds include zinc neodecanoate and zinc versalate. Mixed metal salts containing more than one metal (such as carboxylic acid salts containing both zinc and bismuth) are also suitable catalysts. Preferred catalysts include tin(IV) and bismuth-based compounds.

Tertiary amine catalysts, although much less preferred when used alone, can be used in admixture with the preferred metal catalysts described above. Suitable tertiary amine include triethylamine, tributylamine, N-methylmorpholine, N-ethylmorpholine, N,N,N',N'-tetramethylethylene diamine, pentamethyldiethylene triamine, and higher homologs (German Offenlegungsschriften 2,624,527 and 2,624,528), 1,4-diazabicyclo[2.2.2]octane, N-methyl-N'-(dimethylaminoethyl)piperazine, bis(dimethylaminoalkyl)piperazines (German Offenlegungsschrift 2,636,787), N,N-dimethylbenzylamine, N,N-dimethylcyclohexylamine, N,N-diethylbenzylamine, bis(N,N-diethylaminoethyl) adipate, N,N,N',N'-tetramethyl-1,3-butanediamine, N,N-dimethyl-1,3-phenylethylamine, 1,2-dimethylimidazole, 2-methylimidazole, monocyclic and bicyclic amidines (German Offenlegungsschrift 1,720,633), bis(dialkylamino)alkyl ethers (U.S. Pat. No. 3,330,782, German Auslegeschrifi 030,558, and German Offenlegungsschriften 1,804,361 and 2,618,280), and tertiary amines containing amide groups (preferably formamide groups) according to German Offenlegungsschriften 2,523,633 and 2,732,292. The catalysts used may also be the known Mannich bases of secondary amines (such as dimethylamine) and aldehydes (preferably formaldehyde) or ketones (such as acetone) and phenols.

Other catalysts known in the art, although generally less preferred can also be used.

Suitable additives (B)(f) may optionally also be used in the preparation of the compositions of the invention and include, for example, acid scavengers, water scavengers, defoaming agents, deaeraters, internal mold release agents, pigments, dyes, UV stabilizers, plasticizers, fungistatic or bacteriostatic substances, and fillers, such as those described in European Patent Application 81,701 at column 6, line 40, to column 9, line 31. When used at all, the preferred additives include acid scavengers, water scavengers, and defoaming agents.

Acid scavengers are compounds that control the acidity and water concentration of the compositions of the invention. Preferred acid scavengers include various orthoesters (such as trimethyl orthoformate), carbodiimides (such as 2,2', 6,6'-tetraisopropyldiphenylcarbodiimide, available as STABOXAL I and STABOXAL P from Rhein Chemie Corp.), and epoxides (such as 3,4-epoxycyclohexylmethyl 3,4-epoxycyclohexyl-carboxylate, available as ERL-4221 from Union Carbide). It is generally suitable to use 0 to 2.5 percent by weight of an acid scavenger, preferably a carbodiimide.

Water scavengers (or moisture scavengers) are compounds that maintain a low water content in the compositions of the invention. Suitable water scavengers are described, for example, in U.S. Pat. Nos. 3,755,222 and 4,695,618. Examples of suitable water scavengers include alkali aluminosilicates (such as BAYLITH L, BAYLITH T, and BAYLITH W powders or pastes from Bayer AG, Germany) and chemically reacting water scavengers (such as ZOLDINE MS-Plus from Angus Chemical Company). It is generally suitable to use 1.0 to 10 percent by weight of a water scavenger, preferably an aluminosilicate.

Defoaming agents are compounds known in the art, especially for use with coatings, that inhibit foaming during preparation of the ultimate isocyanate addition products. Examples of suitable defoaming agents include polysiloxanes (such as dimethyl polysiloxane, polysiloxane polyether copolymers, and modified polymethylsiloxanes) and emulsifiable petroleum oils known in the art. It is generally suitable to use 0.01 to 1.0 percent by weight of a defoaming agent, preferably a polysiloxane.

Known fillers and/or reinforcing substances, such as barium sulfate, calcium carbonate, calcium silicate, clays, kieselguhr, whiting, mica, and especially glass fibers, liquid crystal fibers, glass flakes, glass balls, microspheres, aramide fibers, and carbon fibers, are also suitable.

The isocyanate-reactive compositions (B) of the present invention can be prepared by mixing the individual components in essentially any order but are preferably prepared by first mixing components (B)(a), (B)(b), and (B)(c), followed by adding in sequence components (B)(d), (B)(f), and (B)(e).

In a preferred embodiment, the isocyanate-reactive compositions (B) of the present invention contain isocyanate-reactive tertiary amine polyethers (B)(d) that confer storage stability on the flame-retardant compositions. Such isocyanate-reactive compositions can be used for the preparation of various polyurethane products, particularly microcellular and solid polyurethane products, by methods known in the art that are useful for spray applications.

Regardless of the particular polyurethane product to be prepared, the polyurethane-forming reaction components (A) and (B) may be allowed to react, for example, by one-stage reactions, prepolymer reactions, or semiprepolymer reactions. As used herein, the term "polyurethane" also refers to polyureas and polyurethane polyurea hybrids.

When preparing a flame-retardant polyurethane spray system according to the invention with an isocyanate, the quantity of isocyanate component should preferably be such that the isocyanate index is from about 90 to about 120. By "isocyanate index" is meant the quotient of the number of isocyanate groups divided by the number of isocyanate-reactive groups, multiplied by 100.

Spray systems are, of course, applied to suitable substrates using known spray apparatus, such as those described in U.S. Pat. No. 2,764,565. Details concerning processing apparatus that may be used according to the invention may be found in Kunststoff-Handbuch, Vol. VII, Vieweg and H öchtlen, Carl-Hanser-Verlag, Munich 1966. High pressure equipment having the ability to heat the components is generally used for the application of spray systems. The pressure required is generally about 7 to 11 MPa, with throughput of about 3 to 10 kg per minute. The organic polyisocyanate and isocyanate-reactive compositions according to the invention are mixed and sprayed using a spray gun equipped for static, impingement, or dynamic mixing. Suitable two-component spray pumps and guns are manufactured by, for example, Binks Manufacturing Company, Gusmer (PMC, Inc.), Graco Inc., Glass Craft Inc., TAH Industries, and Unipre GmbH.

Suitable substrates for spray application include virtually any solid material, such as polyurethanes, polyesters, epoxy resins, metals, concrete, asbestos, and the like. It is also possible to apply spray systems of the invention to molds or transfer sheets, after which the polyurethane product can be released.

The following examples further illustrate details for the preparation and use of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all parts and percentages are parts by weight and percentages by weight, respectively.

EXAMPLES

The following starting materials were used to prepare the isocyanate-reactive compositions of the Examples: Polyols:

(a1) Glycerol-started polyether of propylene oxide and ethylene oxide (87 wt. % propylene oxide and 13 wt. % ethylene oxide) having a primary OH content of about 82% and a hydroxyl number of 28

(a2) Trimethylolpropane-started polyether of propylene oxide having a hydroxyl number of 370

(a3) Glycerol-started polyether of propylene oxide having a hydroxyl number of 250

(a4) Polyether prepared by the reaction of sucrose, propylene glycol, and water with propylene oxide having a hydroxyl number of 380 (available as MULTRANOL 4035 from Miles Inc.)

(a5) Polyether prepared by the reaction of sucrose, propylene glycol, and water with propylene oxide having a hydroxyl number of 340 (available as MULTRANOL 9171 from Miles Inc.)

Chain extenders and crosslinkers:

(b1) Glycerol-started polyether of propylene oxide having a hydroxyl number of 470

(b2) meta-Xylene diamine (b3) 1-Methyl-3,5-diethyl-2,4- and/or-2,6-diaminobenzene (about 75–80% 2,4-isomer and about 18–24% 2,6-isomer)

Tertiary amine polyether:

(c1) Ethylenediamine-started polyether of propylene oxide having a functionality of 4 and a hydroxyl number of 630

Flame retardants:

(d1) Alumina trihydrate (particle size 9 pro) (available as ATH CM432 from Solem Division, J. M. Huber Corporation)

(d2) Zinc borate (available as ZB-467 from Polymer Additives, Climax Performance Materials Corporation)

(d3) Antimony pentoxide (available as ADP-480 from Nyacol Products, PQ Corporation)

(d4) Antimony trioxide (available as Trutin-40, Laurel Industries) Catalysts:

(e1) Dibutyltin bis(isooctylmaleate) available as DABCO 125 from Air Products & Chemicals, Inc.

(e2) Organotin carboxylate catalyst available as FOMREZ UL-28 from Witco Corporation (e3) Bismuth neodecanoate available from Cosan Chemical Corporation Additives:

(f1) Alkali aluminosilicate (water scavenger available as BAYLITH L from Bayer AG, Germany)

(f2) Defoamer concentrate containing dimethyl polysiloxane dispersed in silicic acid available as Tego FOAMEX N from Tego Chemie Service USA The following organic isocyanates were used to prepare polyurethanes from the isocyanate-reactive compositions of the Examples:

(I) Polyisocyanate containing about 65% monomeric diphenylmethane diisocyanate and 35% polyphenyl-polymethylene-polyisocyanate and having an NCO content about 32% and a viscosity (25° C.) of 30–50 cps (II) Isocyanate prepolymer having an NCO content of 27% (prepared from an MDI-based polyisocyanate and a substoichiometric amount of a polyether triol) available as BAYTEC RE527A from Miles Inc.

The following flame retardants were blended with the isocyanate components:

(d5) Aromatic brominated flame retardant available as SAYTEX 8010 from Ethyl Corporation (d6) Pentabromodiphenyl oxide (available as DE-71 from Great Lakes Chemical Corporation)

(d7) Decabromodiphenyl oxide (available as DE-83 from Great Lakes Chemical Corporation)

Isocyanate-reactive blends were prepared in a fifty-kilogram container by adding the components in the sequence (a), (b), (c), (f), (d), and finally (e) (with catalysts normally being added last). The isocyanatereactive blends were mixed for a total of 30 minutes (or about 15 minutes after the last component was added). Isocyanate blends were prepared by adding flame retardant (d5), (d6), or (d7) to the polyisocyanate or isocyanate prepolymer. The isocyanate blends were mixed for 30 minutes under a nitrogen atmosphere. The isocyanate-reactive blends were allowed to stand for a minimum of twelve hours after being mixed and were then mixed with the isocyanate blends at the isocyanate indexes shown in the Tables. Mixing was carried out in a spray gun equipped with a static or impingement mixer using spray equipment having a metering pump. Spraying was carried out at a temperature of 60° C. and a spray pressure of 10 MPa. The materials were generally sprayed to a thickness of 3 to 4 mm onto a mirrored surface or a polyethylene sheet from which the sprayed polyurethane could release easily. For standard ASTM E-84 testing, the materials were generally sprayed on a 3-mm inorganic reinforced cement board to a thickness of 3 to 4 mm.

For laboratory gel time experiments, a fifty gram sample of the isocyanate-reactive blend was mixed with an isocyanate blend at 25° C. in equal volumes or at a volumetric ratio of four parts of the isocyanatereactive blend for each three parts of the isocyanate blend. Mixing was carried out using Servodyne electronic mixer (Cole Palmer Instrument Company) equipped with a constant speed stirrer. Gel time was determined by observing the time at which voltage across the stirrer (which is proportional to viscosity) crossed the 50 mV level (which corresponds to a viscosity of 13500 cps and to the time at which the polyurethane starts to form gel strings when an applicator stick is plunged into and out of the mixture). Gel time results were reproducible to within 7 to 12 seconds, depending on the amount of filler in the system.

Examples 1–4

Examples 1–4 illustrate the adverse effects on shelf life of flame retardants added to isocyanate-reactive blends and the stabilizing effect achieved by adding tertiary amine polyethers.

Examples 1–2 (comparison)

Comparison Examples 1 and 2 were carried out in the absence of tertiary amine polyethers corresponding to component (c), both with and without flame retardant (d1). The reactions and the gel time determinations were carried out the day after the isocyanate-reactive blends were prepared. When no signs of gelling were observed within 300 seconds, the blends were considered to have deteriorated with complete loss of reactivity within 24 hours. Quantities of components and test results for comparison Examples 1 and 2 are shown in Table 1.

TABLE 1

| Compositions and results for comparison Examples 1 and 2. | | |
|---|---|---|
| Components | Examples | |
| (parts by weight) | 1 | 2 |
| NCO-reactive blend | | |
| Polyether (a1) | 6 | 6 |
| Polyether (a2) | 86.6 | 86.6 |
| Chain extender (b2) | 2.3 | 2.3 |
| Flame retardant (d1) | — | 68.3 |
| Catalyst (e3) | 0.23 | 0.23 |
| Water scavenger (f1) | 5.75 | 5.75 |
| Defoamer (f2) | 0.1 | 0.1 |
| Isocyanate component | | |
| Prepolymer (II) | 100 | 100 |
| Isocyanate index | 93 | 115 |
| Volume ratio[1] | 3:4 | 3:4 |
| Gel data | | |
| Gel time (sec) | 43 | 486 |
| Complete loss of reactivity? | No | Yes |

[1]Volume ratio is the volumetric ratio of the amount of the isocyanate component to the amount of the NCO-reactive blend.

Comparison Examples 1 and 2 show that the presence of flame retardant (d1) causes a complete loss in shelf-life stability.

Examples 3–4

Examples 3-4 were carried out in the presence of tertiary amine polyether (c1) and flame retardants (d1) (isocyanate-reactive blend) and (d5) (isocyanate component). Comparison Example 3 was carried out in the same manner as Example 4 except that tertiary amine polyether (c1) was omitted. The reactions and the gel time determinations were carried out the day after the isocyanate-reactive blends were prepared and again after storage at 23°–25° C. for two weeks and for four or more weeks. Quantities of components and test results for Examples 3 and 4 are shown in Table 2.

TABLE 2

| Compositions and results for Examples 3 and 4. | | |
|---|---|---|
| Components | Examples | |
| (parts by weight) | 3 | 4 |
| NCO-reactive blend | | |
| Polyether (a1) | 3.3 | 3.3 |
| Polyether (a3) | 21.5 | 21.5 |
| Crosslinker (b1) | 26.2 | 26.2 |
| Chain extender (b2) | 1.3 | 1.3 |
| Amine polyether (c1) | — | 10 |
| Flame retardant (d1) | 45 | 45 |
| Catalyst (e1) | 0.06 | 0.06 |
| Catalyst (e3) | 0.13 | 0.13 |
| Water scavenger (f1) | 2.6 | 2.6 |
| Defoamer (f2) | 0.06 | 0.06 |
| Isocyanate component | | |
| Prepolymer (II) | 65 | 65 |
| Flame retardant (d5) | 35 | 35 |
| Isocyanate index | 105 | 98 |
| Volume ratio[1] | 3:4 | 3:4 |
| Change in gel time (sec)[2] | | |
| Two weeks | — | 3 |
| Four weeks | >120 | 8 |

[1] Volume ratio is the volumetric ratio of the amount of the isocyanate component to the amount of the NCO-reactive blend.
[2] Change in gel time relative to reaction after no storage of NCO-reactive blend.

Examples 3 and 4 show that amine polyether (c1) significantly improves shelf-life stability.

Examples 5–14

Examples 5–14 were carried out in the presence of flame retardants (d1) to (d4) (isocyanate-reactive blend) and (d5) and (d6) (isocyanate component). The spray systems were sprayed onto an inorganic cement board to a thickness of 3 to 4 mm and tested using the ASTM E-84 protocol. Testing of the sprayed boards was carried out four weeks after spraying. Quantities of components and test results for Examples 5–14 are shown in Table 3.

The flame retardant spray systems of Examples 6–14 exhibited spray reactivities of about 5 to 20 sec at a spraying temperature of 140° C. In addition, the isocyanate-reactive compositions used to prepare spray systems containing amine polyether (c1) were generally storage-stable. The spray systems of Examples 7, 8, 13, and 14 met Class I (or Class A) flame spread NFPA No. 101 specifications as determined by the ASTM E-84 test protocol, whereas the spray systems of Examples 6 and 10–12 met Class II (or Class B) flame spread specifications. The spray systems of Examples 5 and 9, for which the weight ratios of halogen-containing organic flame retardants to other flame retardants were outside the range specified in the invention, exhibited inferior flame spread properties.

TABLE 3

| Components | Compositions and results for Examples 5 to 14. | | | | | | | | | |
|---|---|---|---|---|---|---|---|---|---|---|
| | Examples | | | | | | | | | |
| (parts by weight) | 5 | 6 | 7 | 8 | 9 | 10 | 11 | 12 | 13 | 14 |
| NCO-reactive blend | | | | | | | | | | |
| Polyether (a3) | — | — | — | — | — | — | — | 30 | 25 | 21 |
| Polyether (a4) | 59 | 59 | 52 | 52 | 50 | 44 | 50 | — | — | — |
| Polyether (a5) | 20 | — | — | — | — | — | — | — | — | — |
| Crosslinker (b1) | — | — | — | — | — | — | — | 16 | 27 | 28 |
| Chain extender (b3) | — | 15 | 5 | 5 | 8 | 8 | 10 | — | — | — |
| Amine polyether (c1) | — | — | 7 | 7 | 7 | 4 | 5 | 8 | 10 | 10 |
| Flame retardant (d1) | — | — | — | — | 15 | 22 | — | 40 | 12 | 20 |
| Flame retardant (d2) | 10 | 15 | 21 | 21 | 12 | 12 | 23 | — | 12 | 9 |
| Flame retardant (d3) | 10 | 10 | 11 | — | 4 | 6 | 8 | — | 8 | 6 |
| Flame retardant (d4) | — | — | — | 11 | — | — | — | — | — | — |
| Catalyst (e1) | — | — | — | — | — | — | — | 0.05 | 0.1 | 0.05 |
| Catalyst (e2) | 1.0 | 1.0 | 1.0 | 1.0 | 0.3 | 0.3 | 0.4 | — | — | — |
| Catalyst (e3) | — | — | — | — | — | — | — | 0.2 | 0.2 | 0.2 |
| Water scavenger (f1) | — | — | 3.45 | 3.45 | 3.2 | 3.2 | 3.2 | 3 | 3 | 3 |
| Defoamer (f2) | — | — | 0.05 | 0.05 | 0.05 | 0.05 | 0.05 | — | — | — |
| Isocyanate component | | | | | | | | | | |
| Prepolymer (I) | 65 | 73 | — | — | 90 | 77 | — | — | — | — |
| Prepolymer (II) | — | — | 65 | 65 | — | — | 77 | 65 | 65 | 65 |
| Flame retardant (d5) | — | — | 35 | 35 | 10 | 23 | 23 | 35 | 35 | 35 |
| Flame retardant (d6) | 35 | 27 | — | — | — | — | — | — | — | — |
| Isocyanate index | 97 | 99 | 99 | 98 | 100 | 103 | 97 | 100 | 97 | 100 |
| Volume ratio[1] | 1:1 | 1:1 | 1:1 | 1:1 | 3:4 | 3:4 | 1:1 | 3:4 | 1:1 | 1:1 |
| Retardant ratio[2] | 1.8:1 | 1.1:1 | 1.1:1 | 1.1:1 | 0.2:1 | 0.4:1 | 0.7:1 | 0.7:1 | 0.8:1 | 0.8:1 |
| Flame spread (ASTM E-84) | 85[5] | 36[4] | 14[3] | 16[3] | 88[5] | 48[4] | 35[4] | 38[4] | 11[3] | 14[3] |

[1] Volume ratio is the volumetric ratio of the amount of the isocyanate component to the amount of the NCO-reactive blend.

TABLE 3-continued

Compositions and results for Examples 5 to 14.

| Components | Examples | | | | | | | | | |
|---|---|---|---|---|---|---|---|---|---|---|
| (parts by weight) | 5 | 6 | 7 | 8 | 9 | 10 | 11 | 12 | 13 | 14 |

$^{(2)}$Retardant ratio is the weight ratio of the total halogen-containing organic flame retardants (d5) and (d6) to other flame retardants (i.e., (d1) to (d4)).
$^{(3)}$Flame spread Class I (or Class A) (National Fire Protection Association Life Safety Code, NFPA No. 101)
$^{(4)}$Flame spread Class II (or Class B) (NFPA No. 101)
$^{(5)}$Flame spread Class III (or Class C) (NFPA No. 101)

Examples 15–26

Examples 15–26 were carried out in the presence of flame retardants (d2) and (d3) (isocyanate-reactive blend) and (d5) to (d7) (isocyanate component). Examples 15–26 are optimized storage-stable flame retardant spray systems having retardant ratios between 0.8:1 and 1.2:1. Quantities of components are shown in Table 4.

wherein

R is a saturated or unsaturated $C_2$–$C_8$ aliphatic group optionally substituted with —OH or —NHR$^a$ wherein R$^a$ is $C_1$–$C_8$ alkyl or $C_2$–$C_8$ alkenyl; or a saturated or unsaturated $C_5$–$C_8$ cycloaliphatic group optionally sub-

TABLE 4

Compositions for Examples 15 to 26.

| Components | Examples | | | | | | | | | | | |
|---|---|---|---|---|---|---|---|---|---|---|---|---|
| (parts by weight) | 15 | 16 | 17 | 18 | 19 | 20 | 21 | 22 | 23 | 24 | 25 | 26 |
| NCO-reactive blend | | | | | | | | | | | | |
| Polyether (a4) | 53 | 53 | 49 | 49 | 49 | 49 | 44 | 39 | 48 | 48 | 52 | 52 |
| Chain extender (b3) | 4.5 | 4.5 | 10 | 10 | 10 | 10 | 5 | 15 | 18 | 15 | 14 | 14 |
| Amine polyether (c1) | 6.5 | 6.5 | 6 | 6 | 6 | 6 | 7 | 6 | 6 | 5 | 6 | 6 |
| Flame retardant (d2) | 22 | 22 | 24 | 24 | 24 | 24 | 30 | 30 | 17 | 17 | 15 | 15 |
| Flame retardant (d3) | 11 | 11 | 9 | 9 | 9 | 9 | 10 | 10 | 8 | 12 | 10 | 10 |
| Catalyst (e1) | 3.0 | 3.0 | 2.0 | 2.0 | 2.0 | 2.0 | 4.0 | 2.0 | 3.0 | 3.0 | 3.0 | 3.0 |
| Water scavenger (f1) | 3.0 | 3.0 | 2.0 | 2.0 | 2.0 | 2.0 | 4.0 | 2.0 | 3.0 | 3.0 | 3.0 | 3.0 |
| Isocyanate component | | | | | | | | | | | | |
| Prepolymer (I) | — | 65 | 65 | 65 | 65 | 65 | — | 70 | 76 | 65 | 76 | 73 |
| Prepolymer (II) | 65 | — | — | — | — | — | 65 | — | — | — | — | — |
| Flame retardant (d5) | — | 35 | — | 15 | 20 | 35 | 35 | — | 24 | 35 | 24 | — |
| Flame retardant (d6) | 35 | — | 35 | 20 | 15 | — | — | 30 | — | — | — | 27 |
| Isocyanate index | 98 | 100 | 107 | 107 | 107 | 107 | 111 | 111 | 100 | 100 | 100 | 100 |
| Volume ratio$^{(1)}$ | 1:1 | 1:1 | 1:1 | 1:1 | 1:1 | 1:1 | 1:1 | 1:1 | 1:1 | 1:1 | 1:1 | 1:1 |
| Retardant ratio$^{(2)}$ | 1.1:1 | 1.1:1 | 1.1:1 | 1.1:1 | 1.1:1 | 1.1:1 | 0.9:1 | 0.8:1 | 1.0:1 | 1.2:1 | 0.9:1 | 1.1:1 |

$^{(1)}$Volume ratio is the volumetric ratio of the amount of the isocyanate component to the amount of the NCO-reactive blend.
$^{(2)}$Retardant ratio is the weight ratio of the total halogen-containing organic flame retardants (d5) and (d6) to other flame retardants (d2) and (d3).

What is claimed is:

1. A flame-retardant polyurethane spray system comprising a mixture, prepared at an isocyanate index of from 90 to 120, comprising
    (A) an isocyanate composition comprising
        (a) an organic polyisocyanate, and
        (b) 20 to 35 percent by weight, relative to the organic polyisocyanate, of a halogen-containing organic flame retardant; and
    (B) an isocyanate-reactive composition comprising
        (a) 10 to 80 percent by weight of at least one isocyanate-reactive compound having a molecular weight of 400 to 10,000 and a functionality of 2 to 7;
        (b) 1 to 50 percent by weight of at least one isocyanate-reactive compound having a molecular weight of less than 399 and a functionality of 2 to 6;
        (c) 3 to 15 percent by weight of an isocyanate-reactive tertiary amine polyether having a molecular weight of 100 to 1000 and having the formula $R[NR^1R^2]_m$ wherein R is a saturated or unsaturated $C_2$–$C_8$ aliphatic group optionally substituted with —OH or —NHR$^a$ wherein R$^a$ is $C_1$–$C_8$ alkyl or $C_2$–$C_8$ alkenyl; or a saturated or unsaturated $C_5$–$C_8$ cycloaliphatic group optionally substituted with $C_1$–$C_8$ alkyl, $C_2$–$C_8$ alkenyl, $C_1$–$C_8$ alkylene, —OH or —NHR$^a$ wherein R$^a$ is alkyl or alkenyl;

$R^1$ and $R^2$ are independently polyether groups terminated with isocyanate-reactive groups selected from —OH and —NHR$^b$ wherein R$^b$ is $C_1$–$C_8$ alkyl or $C_2$–$C_8$ alkenyl; and m is an integer of from 1 to 4;

(d) 5 to 55 percent by weight of a combination of (i) one or more flame retardants, other than a halogen-containing organic flame retardant, selected from antimony oxides or mixtures of antimony oxides with one or more other flame retardants selected from zinc compounds, aluminum compounds, magnesium compounds, or molybdenum compounds with (ii) a halogen-containing organic flame retardant, with the proviso that the weight ratio of the total amount of halogen-containing organic flame retardant in compositions (A) and (B) to the amount of other flame retardants in composition (B) is from 0.4 to 1.5;

(e) 0.01 to 1.5 percent by weight of an organic metal catalyst or a mixture thereof with a tertiary amine catalyst; and (f) 0 to 15 percent by weight of additives, wherein the quantities of each component of isocyanate-reactive composition (B) are based on the total amount of components (B)(a), (B)(b), (B)(c), (B)(d), and (B)(e).

2. A flame-retardant polyurethane spray system according to claim 1 wherein halogen-containing organic flame retardant (A)(b) is a halogen-containing aromatic flame retardant.

3. A flame-retardant polyurethane spray system according to claim 1 wherein isocyanate-reactive compound (B)(a) is a polyether, a polyester, or a polyacetal.

4. A flame-retardant polyurethane spray system according to claim 1 wherein isocyanate-reactive compound (B)(a) has a functionality of 2 to 4.

5. A flame-retardant polyurethane spray system according to claim 1 wherein 20 to 60 percent by weight of isocyanate-reactive compound (B)(a) is used.

6. A flame-retardant polyurethane spray system according to claim 1 wherein isocyanate-reactive compound (B)(b) is an aromatic diamine chain extender.

7. A flame-retardant polyurethane spray system according to claim 1 wherein isocyanate-reactive compound (B)(b) has a functionality of 2 to 4.

8. A flame-retardant polyurethane spray system according to claim 1 wherein 3 to 35 percent by weight of isocyanate-reactive compound (B)(b) is used.

9. A flame-retardant polyurethane spray system according to claim 1 wherein isocyanate-reactive amine polyether (B)(c) has a molecular weight of 200 to 600 and has the formula $R[NR^1R^2]_2$ 

wherein R is a difunctional saturated $C_2$–$C_8$ aliphatic group and $R^1$ and $R^2$ are independently hydroxy-terminated polyethers containing exclusively polypropylene oxide units.

10. A flame-retardant polyurethane spray system according to claim 1 wherein 20 to 48 percent by weight of one or more flame retardants is used in component (B)(d).

11. A flame-retardant polyurethane spray system according to claim 1 wherein the weight ratio of the total amount of halogen-containing organic flame retardant in compositions (A) and (B) to the amount of other flame retardants in composition (B) is from 0.4 to 1.2.

12. A flame-retardant polyurethane spray system according to claim 1 wherein the organic metal catalyst of component (B)(e) is a tin and/or bismuth compound.

13. A method for coating a substrate with a polyurethane comprising spraying a flame-retardant polyurethane spray system according to claim 1 onto a substrate.

14. A method for preparing a molded polyurethane comprising spraying a flame-retardant polyurethane spray system according to claim 1 into a mold and then releasing the polyurethane from the mold.

15. A polyurethane containing a flame retardant prepared by spraying a flame-retardant polyurethane spray system according to claim 1 onto a substrate.

16. A polyurethane containing a flame retardant prepared by spraying a flame-retardant polyurethane spray system according to claim 1 onto a mold and then releasing the polyurethane from the mold.

17. A flame-retardant polyurethane spray system according to claim 1 wherein the flame retardant, other than a halogen-containing organic flame retardant, is an antimony oxide or a mixtures of an antimony oxides with a zinc borate and/or alumina trihydrate.

* * * * *